(12) United States Patent
Brady et al.

(10) Patent No.: US 10,023,434 B2
(45) Date of Patent: Jul. 17, 2018

(54) ROBOTIC ENABLED VERTICAL LIFT

(71) Applicant: Amazon Technologies, Inc., Seattle, WA (US)

(72) Inventors: Tye Michael Brady, Southborough, MA (US); James R. Allard, Newton, MA (US); Thomas Culliton, Arlington, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/268,775

(22) Filed: Sep. 19, 2016

(65) Prior Publication Data

US 2018/0079626 A1 Mar. 22, 2018

(51) Int. Cl.
*B66B 9/02* (2006.01)
*B66F 7/24* (2006.01)

(52) U.S. Cl.
CPC .............. *B66B 9/02* (2013.01); *B66F 7/243* (2013.01)

(58) Field of Classification Search
CPC .......... B66B 9/022; B65G 1/06; B65G 1/065; B66F 7/24
See application file for complete search history.

(56) References Cited

U.S. PATENT DOCUMENTS

| | | | |
|---|---|---|---|
| 2,538,517 A | 1/1951 | Hayden | |
| 2,579,688 A * | 12/1951 | McCormick | B66F 7/24 187/212 |
| 3,637,099 A * | 1/1972 | Perrier | B66F 7/02 187/212 |
| 4,582,500 A | 4/1986 | Hanson et al. | |
| 8,327,979 B2 * | 12/2012 | Lynch | B66F 7/24 187/212 |
| 2008/0042114 A1 | 2/2008 | Stanislao | |

FOREIGN PATENT DOCUMENTS

JP H07206324 8/1995

OTHER PUBLICATIONS

PCT Patent Application PCT/US2017/050175 filed Sep. 6, 2017, International Search Report and Written Opinion dated Nov. 30, 2017.

* cited by examiner

*Primary Examiner* — Kaitlin S Joerger
(74) *Attorney, Agent, or Firm* — Thomas | Horstemeyer, LLP; Michael J. D'Aurelio; Jason M. Perilla

(57) ABSTRACT

Robotic enabled lift concepts are described. In one embodiment, a vertical lift includes a vertically directed track assembly and linear actuator that extend between first and second levels. The lift further includes a lift platform having a continuous contact roller such as a continuous belt, for example, a platform guide assembly for engagement with the track assembly, and a motion translation mechanism mechanically coupled between the continuous contact roller and the linear actuator. A robotic drive unit can drive upon and dock with the lift platform. In that docked position, the robotic drive unit can rotate its drive wheels to raise or lower itself between the first and second levels based on the translation of the motive forces of the drive wheels through the motion translation mechanism and to the vertically directed linear actuator. Other embodiments include a lift arm, an inclined track assembly, and a lift carriage.

20 Claims, 10 Drawing Sheets

ROBOTIC ENABLED VERTICAL LIFT

BACKGROUND

As fulfillment centers continue to accommodate more items, mezzanine structures and multiple levels or floors have provided a flexible option to expand capacity without the need for an increased ground-level footprint. Robotic systems have also been useful in warehouse and fulfillment center operations. Among other tasks, robotic systems can be relied upon to assist with picking and placing items. As another example, items can be moved from place to place in a warehouse using robotic systems to automate package handling operations.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

DETAILED DESCRIPTION

Figure 1A:
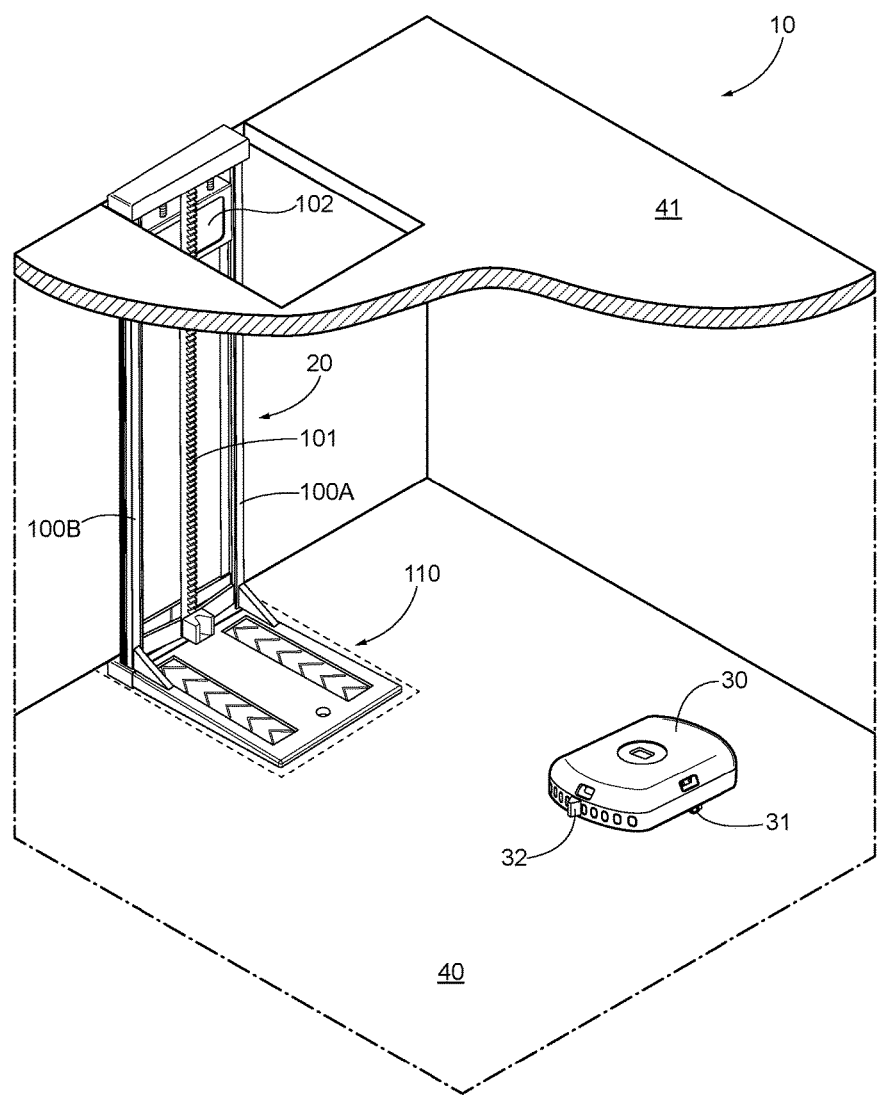
FIG. 1A illustrates a perspective view of an example robotic enabled vertical lift system according to various embodiments.

To more effectively utilize and expand the available space, mezzanine structures and multiple levels or floors have provided a flexible option to expand capacity in fulfillment centers. While robotic systems have been useful in fulfillment center operations to assist with picking and placing items, many robotic systems are limited to movement over only a single floor or level in fulfillment centers. Such robotic systems or drive units lack the ability to use stairs, ladders, or otherwise navigate between different levels or floors.

In the context outlined above, robotically-enabled reciprocating vertical lift systems are described herein. In one example, a vertical reciprocating lift includes a vertically directed track assembly and a linear gear actuator that extend between first and second floors or levels. The lift also includes a lift platform having a continuous contact roller such as a continuous belt, for example, to be driven by a robotic drive unit, a platform guide assembly to attach to and roll along the vertically directed track assembly, and a motion translation mechanism that is mechanically coupled between the continuous contact roller and the linear gear actuator.

A robotic drive unit can drive upon and dock with the lift platform. In that docked position, the robotic drive unit can rotate its drive wheels to raise or lower itself between the first and second levels using the forces generated by its own drive wheels. Particularly, based on the translation of the motive forces from the drive wheels, to the contact roller of the lift platform, through the motion translation mechanism, and to the vertically directed linear actuator, the robotic drive unit can raise or lower itself between the first and second levels while resting upon the lift platform. The example vertical lift systems can be installed in fulfillment centers to provide robotic access between floors or levels of mezzanine structures and floors.

In another example, a vertical lift system can include a lift arm rather than a lift platform. The lift arm can incorporate a drive coupling at one distal end. The robotic drive unit can include a robotic drive coupling on its underside having structural features complimentary to the drive coupling of the lift arm. The robotic drive unit can drive over and, in some cases, dock with the lift arm. In that docked position, the robotic drive unit can lower or retract its drive wheels to lower the robotic drive coupling into engagement with the drive coupling at the distal end of the lift arm. Once engaged with the drive coupling of the lift arm, the robotic drive unit can raise or lower itself between first and second levels by rotating the robotic drive coupling. Particularly, based on the translation of the motive forces from the robotic drive coupling, to the drive coupling of the lift arm, through a motion translation mechanism in the lift arm, and to a vertically directed linear actuator, the robotic drive unit can raise or lower itself between the first and second levels while resting upon the lift arm.

In still another example, a vertical lift system can include a ramp having inclined rails that extend between levels, a lift carriage including a gear mechanism exposed on a top surface of the lift carriage, and a robotic drive unit including drive wheels. The drive wheels have geared hubs to engage with the gear mechanism exposed on the top surface of the lift carriage. Once the geared hubs are engaged with the gear mechanism, the robotic drive unit can drive the gear mechanism to transfer forces to the rails and move the lift carriage up or down as further described below.

Turning to the drawings, FIG. 1A illustrates a perspective view of an example robotic enabled vertical lift system 10 according to various embodiments. The vertical lift system 10 includes a vertical reciprocating lift 20 and a robotic drive unit 30. As shown in FIG. 1A, the vertical reciprocating lift 20 extends between a first floor level 40 and a second floor level 41. The robotic drive unit 30 can use the vertical reciprocating lift 20 to move between the first floor level 40 and a second floor level 41.

The robotic drive unit 30 can be embodied as a drive unit configured to move items in a materials handling fulfillment center facility. The items can include boxes, pallets, shelving units (e.g., shelving pods) or any other items of suitable size and/or shape for transportation. In that context, the robotic drive unit 30 includes one or more drive wheels 31 to move the robotic drive unit 30 and items around the first floor level 40 and the second floor level 41. The robotic drive unit 30, among others, can be directed based on a set of predetermined control instructions, control signals from sensors, information read from machine-readable barcode stickers, etc. In one example case, when the robotic drive unit 30 reaches a target location, it can slide underneath a shelving pod and lift the shelving pod off the ground. The robotic drive unit 30 then carries the shelving pod to another desired location.

Before describing the structural elements and functions of the vertical reciprocating lift 20 in greater detail, it is noted that the illustration in FIG. 1A is provided as a representative example. The vertical reciprocating lift 20 or various components thereof can vary in size (e.g., height, width, etc.), shape, and form while serving a similar function as compared to that shown. Additionally, one or more components can be added or omitted in practice as compared to that shown. Further, the vertical reciprocating lift 20 can be embodied by any suitable combination of the example components (and alternative components) described herein.

In the embodiment shown in FIG. 1A, the vertical reciprocating lift 20 includes a vertically directed track assembly including rails 100A and 100B (collectively "track assembly 100"), a rack gear 101 of a vertically directed linear actuator, a counterweight 102 of a counterweight assembly, and a lift platform 110. As shown in FIG. 1A, the track assembly 100 and the rack gear 101 extend between the first floor level 40 and the second floor level 41. Thus, the track assembly 100 and the rack gear 101 are vertically directed, but do not necessarily need to be perpendicular to the first floor level 40. The track assembly 100 and the rack gear 101 can also be vertically directed between the first floor level 40 and the second floor level 41 at an angle, similar to a ramp. The robotic drive unit 30 can use the vertical reciprocating lift 20 to lift and lower itself between the first floor level 40 and the second floor level 41. Particularly, the robotic drive unit 30 can drive over or upon (and possibly dock with) the lift platform 110 and, in some cases, engage itself into place as described below. In that position, the robotic drive unit 30 can rotate its drive wheels 31 to raise or lower itself between the first floor level 40 and the second floor level 41 using the forces generated by its drive wheels 31.

The lift platform 110 supports the robotic drive unit on the track assembly 100 and includes components to translate the motive forces from the drive wheels 31 of the robotic drive unit 30 to the rack gear 101 of the vertically directed linear actuator. Those motive forces, as applied against the rack gear 101 of the vertically directed linear actuator, cause the lift platform 110 to raise or lower between the first floor level 40 and the second floor level 41. Thus, with the robotic drive unit 30 positioned upon the lift platform 110, the robotic drive unit 30 can use the motive forces from the drive wheels 31 to raise and lower itself between the first floor level 40 and the second floor level 41.

The counterweight 102 can be embodied as any suitable weight to counterbalance against the weight of the lift platform 110 and/or the robotic drive unit 30. As described in further detail below with reference to FIG. 1D, the counterweight 102 can be counterbalanced against the lift platform 110 using wires, ropes, pulleys, other attachment devices, or any combination thereof. In various embodiments, the size, mass, or weight of the counterweight 102 can be selected based on the weight of the robotic drive unit 30, the expected or average weights of loads typically carried by the robotic drive unit 30, some combination of those weights, or other relevant factors. With the counterweight 102 counterbalanced against the lift platform 110, less motive forces are required from the drive wheels 31 of the robotic drive unit 30 to raise and lower the robotic drive unit 30 between the first floor level 40 and the second floor level 41.

In a variation on the embodiment shown in FIG. 1A, the rack gear 101 can include teeth on two opposing faces. In that case, the vertical reciprocating lift 20 can include a second lift platform similar to the lift platform 110 but mechanically coupled to the back of the rack gear 101 and extending from the back or opposite side of the vertical reciprocating lift 20. In that way, the vertical reciprocating lift 20 can accommodate two lift platforms.

Figure 1B:
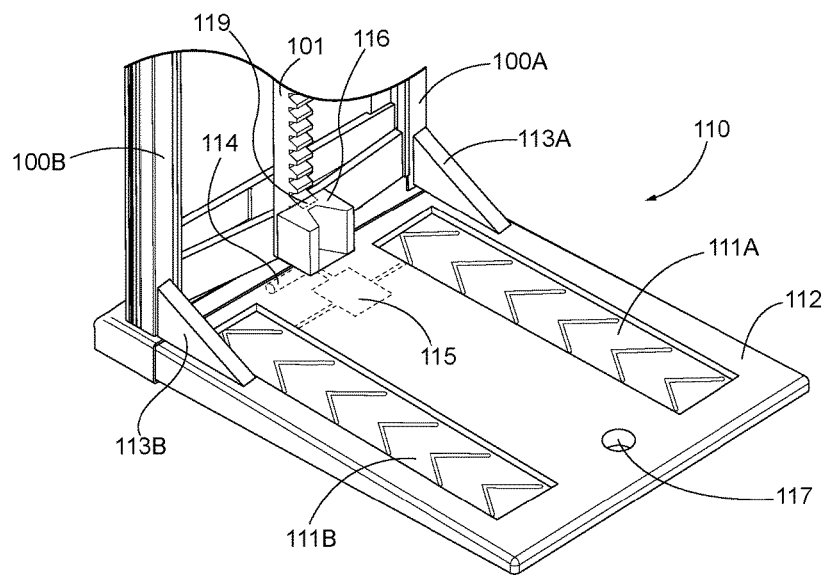
FIG. 1B illustrates an enlarged view of a lift platform of a vertical reciprocating lift in the system shown in FIG. 1A according to various embodiments.
Figure 1C:
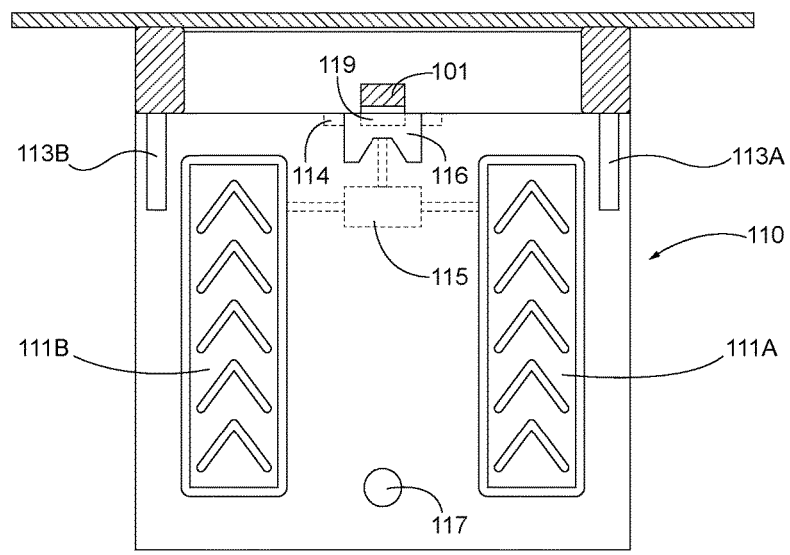
FIG. 1C illustrates a top-down plan view of the lift platform shown in FIG. 1A according to various embodiments.

To further discuss the components of the lift platform 110, FIG. 1B illustrates an enlarged view of the lift platform 110 shown in FIG. 1A, and FIG. 1C illustrates a top-down plan view of the lift platform 110 shown in FIG. 1A. Referring between FIGS. 1B and 1C, the lift platform 110 includes one or more continuous contact rollers, such as the continuous contact treads 111A and 111B (collectively "treads 111"), which are shown exposed through openings in the top surface 112 of the lift platform 110. The lift platform 110 further includes a platform guide assembly including guides 113A and 113C (collectively "guides 113") for engagement with the track assembly 100, a pinion gear 114 of the linear actuator, a motive force translation mechanism 115, an engagement dock 116 to engage with a mating dock connector 32 on the robotic drive unit 30, and a locking aperture 117.

Figure 2A:
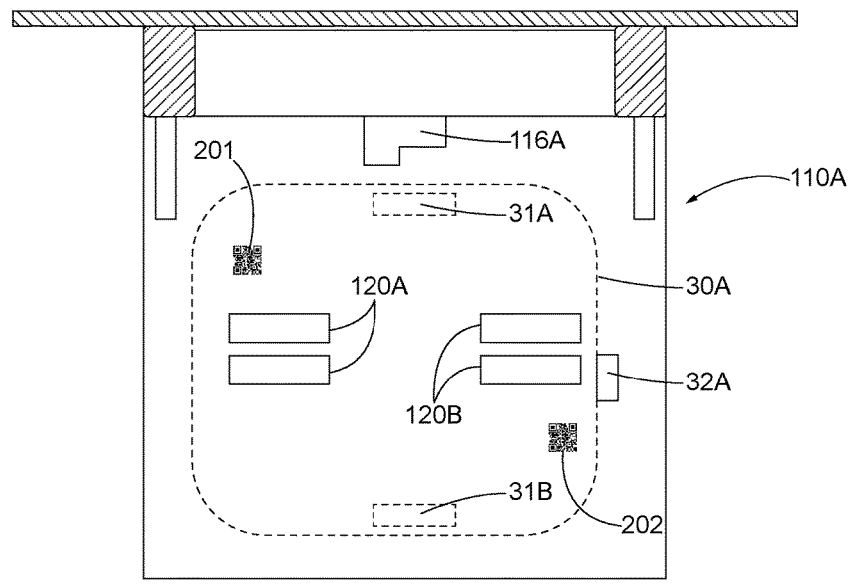
FIGS. 2A and 2B illustrate top-down plan views of another lift platform that can be used with the robotic enabled vertical lift system shown in FIG. 1A according to various embodiments.
Figure 2B:
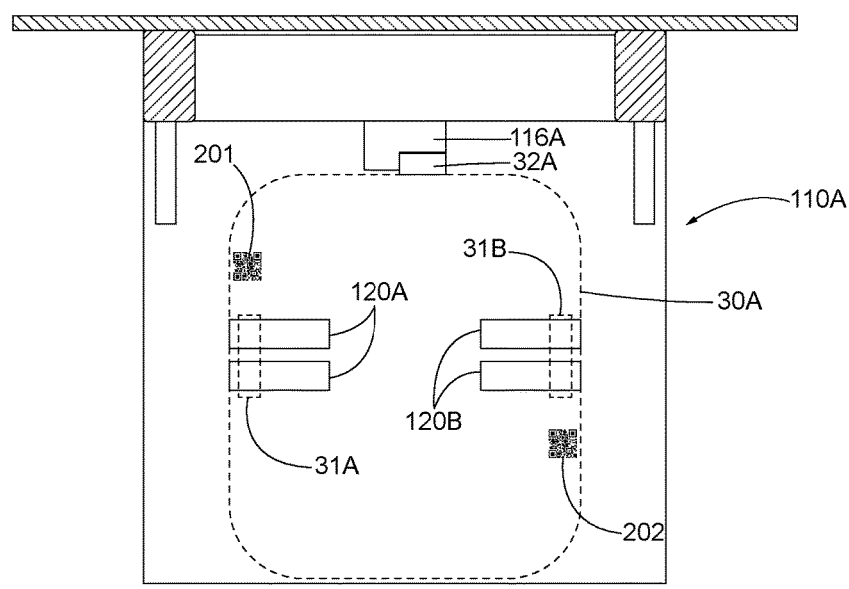

The treads 111 can be embodied as continuous, flexible belts of suitable size formed from rubber or other material(s). At opposite ends within the lift platform 110, the treads 111 can be wrapped around freely-rotating, fixed-location rollers. When forces are applied to the treads 111 (e.g., at least partially in the directions "A" or "B"), the treads 111 rotate or turn around the fixed-location rollers. One or more of the fixed-location rollers transfer that rotational energy to the translation mechanism 115, which is described in further detail below. In other embodiments, the lift platform 110 can include other types of continuous contact rollers besides belts or treads. For example, FIGS. 2A and 2B illustrate another example in which two pairs of rollers are relied upon in place of the treads 111.

The guides 113 can be slidably attached to the track assembly 100 in any suitable manner and using any suitable structure(s) which permit the lift platform 110 to slide, glide, roll, or otherwise travel along the track assembly 100 between the first floor level 40 and the second floor level 41 with relatively minimal friction. In that context, the guides 113 can incorporate one or more wheels, rollers, sliders, mechanically-interlocking faces, other interlocking features, and combinations thereof.

Together, the pinion gear 114 and the rack gear 101 form the vertically directed linear actuator in the vertical reciprocating lift 20. The pinion gear 114 is integral with the lift platform 110 and, as described in further detail below, is mechanically coupled through the translation mechanism 115 to receive the motive forces applied to the treads 111 by the robotic drive unit 30. In various embodiments, the vertically directed linear actuator can be embodied, at least in part, using any suitable type of linear actuator assembly. In the example shown in FIGS. 1A-1C, the vertically directed linear actuator is be embodied as a rack and pinion gear arrangement. In other cases, the vertically directed linear actuator can be embodied as a worm and worm gear arrangement. The vertically directed linear actuator is not limited to rack and pinion or worm gear structures, however, as any suitable mechanical linear actuator can be relied upon, such as ball screws, belt drives, and other assemblies that convert rotary to linear motion.

The translation mechanism 115 can be embodied as an arrangement of gears, shafts, couplings, etc. to mechanically couple the motive forces applied to the treads 111 to rotary forces that drive the pinion gear 114 in the lift platform 110. In that context, the translation mechanism 115 can include a ring and pinion gear arrangement, for example, among other arrangements of gears, shafts, belts, couplings, or other suitable components configured to couple mechanical forces between components.

The engagement dock 116 can be embodied as a fixture to align and dock the robotic drive unit 30 at a desired position over the lift platform 110. In that context, the engagement dock 116 and the mating dock connector 32 can be formed to have complimentary shapes for accurate positioning of the robotic drive unit 30 over the treads 111. Based on the design of the vertical reciprocating lift 20, when the mating dock connector 32 of the robotic drive unit 30 is aligned and engaged with the engagement dock 116, the drive wheels 31 of the robotic drive unit 30 are positioned over the treads 111. In that position, the drive wheels 31 of the robotic drive unit 30 can apply forces to the treads 111 based on clockwise or counter-clockwise directions of rotation of the drive wheels 31.

The locking aperture 117 includes a hole, opening, or aperture in the top surface 112 of the lift platform 110. The robotic drive unit 30, when engaged with the engagement dock 116, can drop a pin or bolt, for example, into the locking aperture 117 to help secure it in place. Thus, the locking aperture 117 can help to maintain the drive wheels 31 of the robotic drive unit 30 over the treads 111 while drive forces are applied to the treads 111.

In other aspects of the embodiments, the engagement dock 116 can include an arresting mechanism 119 to arrest the translation mechanism 115, the pinion gear 114, and/or the treads 111 when the mating dock connector 32 of the robotic drive unit 30 is disengaged from the engagement dock 116. The arresting mechanism 119 can be embodied as a mechanical interference to the translation mechanism 115, the pinion gear 114, or the treads 111, such as an interfering hook, tooth, pin, or other locking feature that inhibits movement. Thus, when the engagement dock 116 is not engaged with the robotic drive unit 30 (or any other robotic drive unit), the engagement dock 116 arrests any movement between the pinion gear 114 and the rack gear 101, and the lift platform 110 can be fixed in place. On the other hand, the engagement dock 116 can release the translation mechanism 115, the pinion gear 114, and/or the treads 111 for movement when the mating dock connector 32 of the robotic drive unit 30 (or a similar mating dock connector of another robotic drive unit) is engaged with the engagement dock 116.

Additionally, in some cases, the engagement dock 116 can include an interlock that prevents the mating dock connector 32 of the robotic drive unit 30 from disengaging if the lift platform 110 is in motion or positioned in transition between the first floor level 40 and the second floor level 41. Thus, using an interlock or other mechanical interference, the engagement dock 116 can prevent the robotic drive unit 30 from driving and/or falling off the lift platform 110 unless it is safely positioned at a floor level.

Further, one or both of the engagement dock 116 and the translation mechanism 115 can include an arresting mechanism 119 to arrest any vertical motion of the lift platform 110 if the battery of the robotic drive unit 30 fails during lifting or lowering operations. For that purpose, the engagement dock 116 can include an electrical interface with the mating dock connector 32 of the robotic drive unit 30. Through that electrical interface, the vertical reciprocating lift 20 can determine certain status information about the robotic drive unit 30, such as the battery charge level, discharge rate, and other operational status information. If the battery of the robotic drive unit 30 lacks sufficient power for the robotic drive unit 30 to raise or lower itself to the first floor level 40 or the second floor level 41, the engagement dock 116 and the translation mechanism 115 can arrest any vertical motion of the lift platform 110 to prevent it from falling. Additionally or alternatively, the drive wheels 31 of the robotic drive unit 30 can be arrested (e.g., halted, shorted, etc.) if the battery of the robotic drive unit 30 fails, effectively preventing the continuous contact treads 111A and 111B from moving to raise or lower the lift platform 110.

Figure 1D:
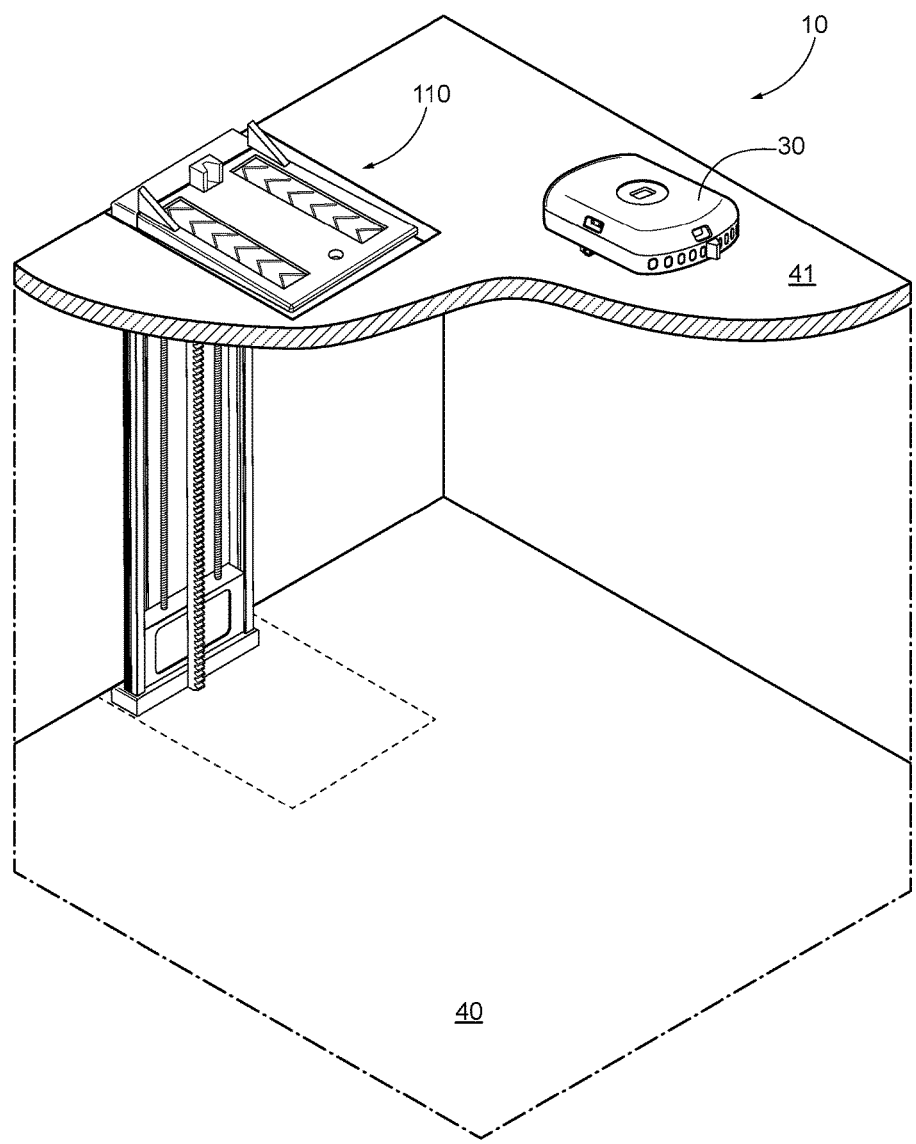
FIG. 1D illustrates the system shown in FIG. 1A with the lift platform raised to a second floor level according to various embodiments.

FIG. 1D illustrates the vertical lift system 10 shown in FIG. 1A with the lift platform 110 raised and the robotic drive unit 30 positioned on the second floor level 41. To more effectively utilize and expand the available space in fulfillment centers, for example, mezzanine structures and multiple levels or floors have provided a flexible option to expand capacity. Using the vertical reciprocating lift 20, the robotic drive unit 30 can help place, retrieve, and move pods and other items between the between the first floor level 40 and the second floor level 41, among others.

In FIG. 1D, the counterweight 102 is shown lowered to the first floor level 40. The counterweight cables 118A and 118B are also shown attached at one end to the counterweight 102. The other end of the counterweight cables 118A and 118B can be mechanically coupled or attached to the guides 113 or the wheels, rollers, sliders, mechanically-interlocking faces, or other interlocking features of the guides 113, possibly through one or more pulleys or other guides. Additionally or alternatively, the other end of the counterweight cables 118A and 118B can be mechanically coupled or attached to the top surface 112 (or another suitable place or component) of the lift platform 110.

Turning to other embodiments, FIGS. 2A and 2B illustrate top-down plan views of another lift platform 110A that can be used with the robotic enabled vertical lift system 10 shown in FIG. 1A. The lift platform 110A is similar to the lift platform 110 shown in FIGS. 1A-1D, but includes two pairs of rollers 120A and 120B (collectively "rollers 120") in place of the treads 111. Additionally, the lift platform 110A includes the rotational engagement dock 116A in place of the engagement dock 116 shown in FIGS. 1A-1D, and the robotic drive unit 30A includes the rotational mating dock connector 32A in place of the mating dock connector 32 shown in FIGS. 1A-1D.

The two pairs of rollers 120A and 120B can be mechanically coupled together and/or coupled to the same motion translation mechanism (e.g., similar to the translation mechanism 115). Thus, the two pairs of rollers 120A and 120B may seize or lock up when opposing (i.e., different clockwise/counter-clockwise direction) motive forces are applied to the rollers 120A and 120B respectively. In other words, a clockwise motive force applied to the rollers 120A will oppose a counter-clockwise motive force applied to the rollers 120B. Thus, the rollers 120A and 120B tend to seize when opposing motive forces of substantially equal magnitude are applied.

In use, the robotic drive unit 30A can drive upon the lift platform 110A from either side and, once suitably positioned at about the center of the lift platform 110A as shown in FIG. 2A, rotate 90 degrees counter-clockwise (or clockwise in other cases) to arrive at the position shown in FIG. 2B with the mating dock connector 32A engaged with the engagement dock 116A. As shown in FIG. 2B, the drive wheels 31A and 31B of the robotic drive unit 30A are positioned over the two pairs of rollers 120A and 120B, respectively, to drive the rollers 120A and 120B in clockwise and counter-clockwise directions.

The engagement dock 116A and the mating dock connector 32A can be designed to engage and disengage when those components approach each other from the side direction, such as when the robotic drive unit rotates from the position shown in FIG. 2A to the position shown in FIG. 2B. The engagement dock 116A and the mating dock connector 32A can also be designed to prevent disengagement based on forces applied in other directions. Thus, once the engagement dock 116A and the mating dock connector 32A are engaged together, the drive wheels 31A and 31B of the robotic drive unit 30A cannot pull the robotic drive unit 30A off the lift platform 110A when the drive wheels 31A and 31B are both rotated (i.e., driven) in the same clockwise or counter-clockwise direction. Instead, to disengage, the drive wheels 31A and 31B of the robotic drive unit 30A can be driven in opposite directions, causing the robotic drive unit 30A to rotate and the mating dock connector 32A to disengage from the engagement dock 116A.

Machine-readable indicators, such as the indicators 201 and 202 shown in FIGS. 2A and 2B, can be inspected by the robotic drive unit 30A to read certain information. In various cases, the indicators 201 and 202 can be embodied as machine-readable bar codes, Quick Response (QR) codes, or other optically- or visually-readable indicators. In other cases, the indicators 201 and 202 can be embodied as radio-frequency (RF) identification tags or some other type of readable indicator for the robotic drive unit 30A. In the context of machine-readable indicators, the robotic drive unit 30A (and the other robotic drive units described herein) can incorporate one or more cameras, RF readers, barcode scanners, or other components to read the indicators 201 and 202.

The indicators 201 and 202 can include any type of information useful for the command and/or control of the robotic drive unit 30A. In the case shown in FIGS. 2A and 2B, for example, the indicators 201 and 202 can identify certain quadrants or corners of the lift platform 110A for positioning the robotic drive unit 30 either before, after, or during rotation. In other cases, indicators can be used to identify and/or distinguish certain floors, lifts, or other waypoints for navigation. Thus, the indicators can be used by the robotic drive unit 30A (and others) to confirm locations and other information during processes.

Figure 3:
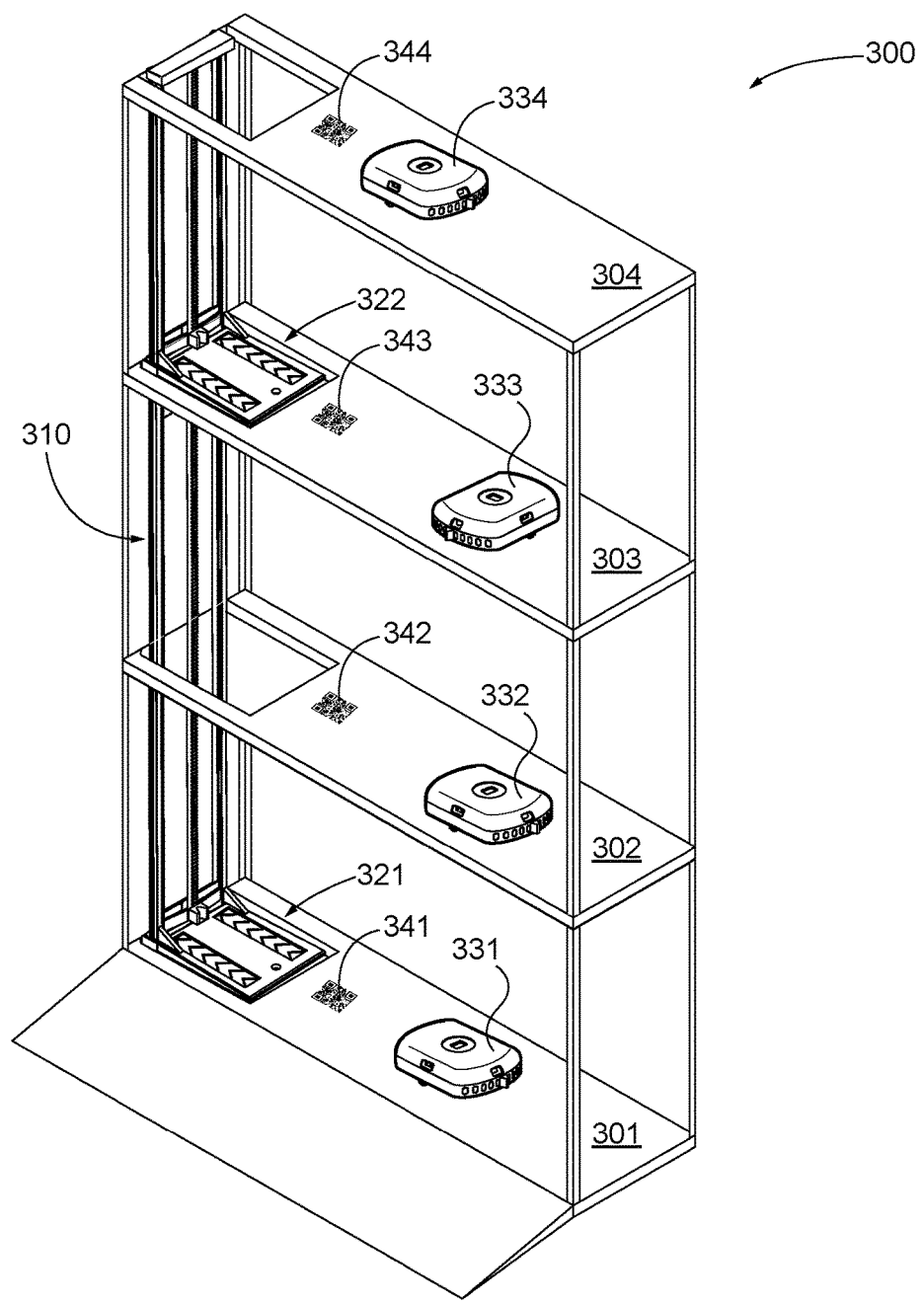
FIG. 3 illustrates an example multi-level mezzanine structure and vertical reciprocating lift according to various embodiments.

FIG. 3 illustrates an example multi-level mezzanine structure 300 and vertical reciprocating lift 310 according to various embodiments. The mezzanine structure 300 and vertical reciprocating lift 310 are provided as representative examples. For example, while the mezzanine structure 300 shown in FIG. 3 includes levels 301, 302, 303, and 304, other mezzanine structures can include any suitable number of levels, and each level can be of any suitable size. Additionally, the vertical reciprocating lift 310 can be placed at any suitable location in or around the mezzanine structure 300. Thus, although the vertical reciprocating lift 310 is shown incorporated into an end of the mezzanine structure 300 in FIG. 3, the vertical reciprocating lift 310 can be installed along or abutting any side or at any location within any level of the mezzanine structure 300. Additionally, the vertical reciprocating lift 310 shown in FIG. 3 extends vertically from the first, lowest level 301 to the last, highest level 304, but the vertical reciprocating lift 310 can extend between any two or more levels without extending among all levels of mezzanine structures. Further, in other cases, any number of vertical reciprocating lifts can be used with the mezzanine structure 300 (or others) to provide several options for the robotic drive units 331-334 to travel between the floors 301-304.

The vertical reciprocating lift 310 is shown including a first lift platform 321 and a second lift platform 322. In one case, the first lift platform 321 can be limited to movement between the floors 301 and 302, and the second lift platform 322 can be limited to movement between the floors 303 and 304. In other cases, both the first lift platform 321 and second lift platform 322 can be free to move between any of the floors 301-304 with the only constraint being that they do not interfere with each other. In still other cases, one of the first lift platform 321 or second lift platform 322 can be omitted, or additional lift platforms can be included for use with the vertical reciprocating lift 310.

In FIG. 3, the first lift platform 321 and the second lift platform 322 are illustrated as being similar to the lift platform 110 shown in FIGS. 1A-1D, but can be similar to the lift platform 110A shown in FIGS. 2A and 2B in other cases. Additionally, the vertical reciprocating lift 310 can include combinations of different styles of lift platforms. Finally, FIG. 3 also illustrates the indicators 341-343 positioned, respectively, on the floors 301-304, but the indicators 341-343 can be placed at other suitable locations such as on walls, signs, or other conspicuous locations. The indicators 341-343 can be read by the robotic drive units 331-334 from certain positions on the lift platforms 321 and 322 and/or the floors 301-304 using cameras, barcode scanners, or other sensors. The indicators 341-343 can convey various types of useful information such as floor location, vertical reciprocating lift identifier, etc. The robotic drive units 331-334 can determine their floor locations, elevations, or vertical positions in other ways besides referring to the indicators 341-343. For example, the robotic drive units 331-334 can include barometric, global positioning system (GPS), or other sensors to determine vertical location or height.

Figure 4A:
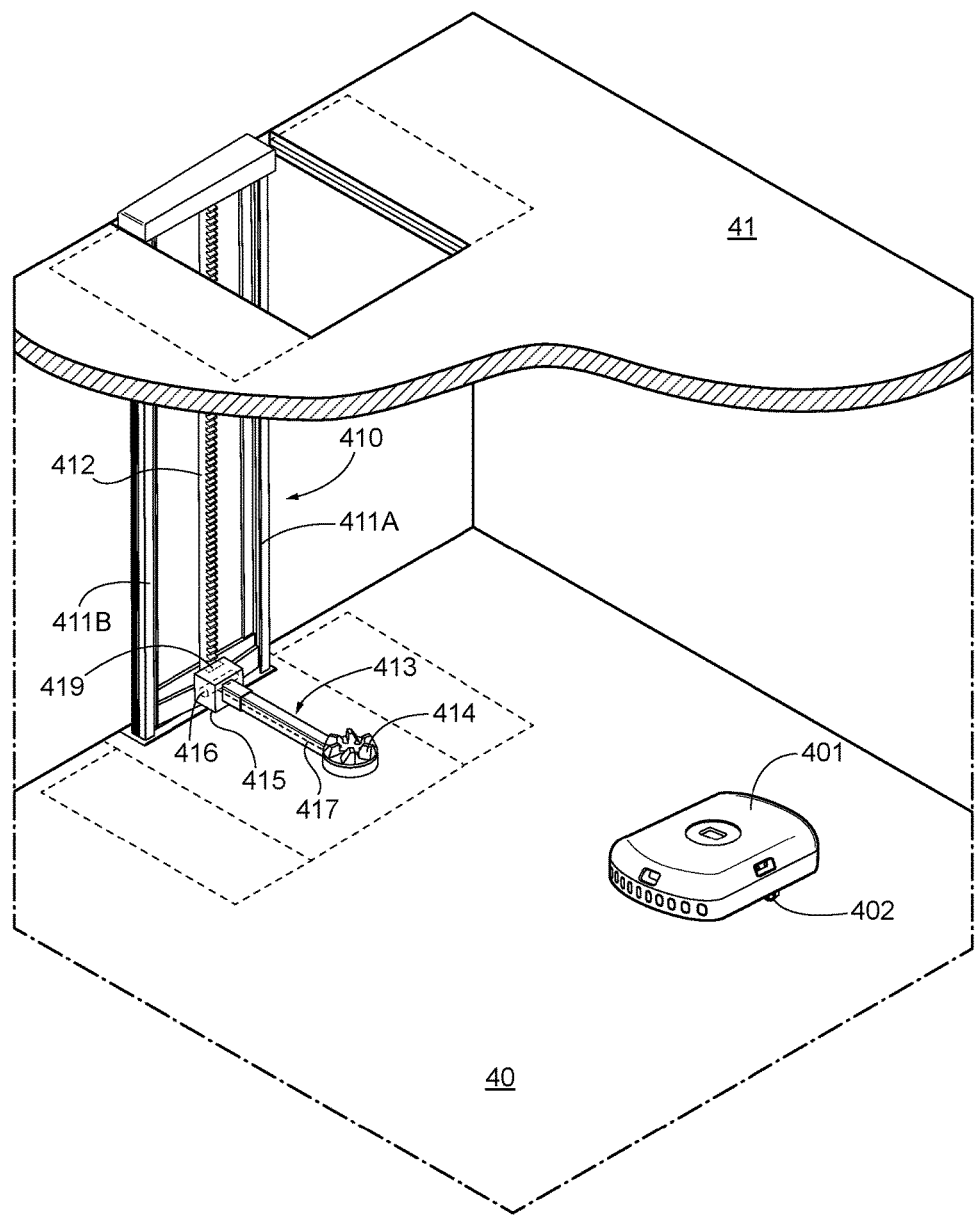
FIG. 4A illustrates a perspective view of another example robotic enabled vertical lift system according to various embodiments.

FIG. 4A illustrates a perspective view of another example robotic enabled vertical lift system 400 according to various embodiments. The system 400 includes a robotic drive unit 401 and a vertical reciprocating lift 410. As shown in FIG. 4A, the vertical reciprocating lift 410 extends between the first floor level 40 and the second floor level 41. The illustration in FIG. 4A is provided as a representative example. In various embodiments, the vertical reciprocating lift 410 or various components thereof can vary in size (e.g., height, width, etc.) shape, and form while serving a similar function in other embodiments as compared to that shown. Additionally, one or more components can be added or omitted in practice as compared to that shown.

The vertical reciprocating lift 410 includes a vertically directed track assembly including rails 411A and 411B (collectively "track assembly 411"), a rack gear 412 of a vertically directed linear actuator, and a lift arm 413. As shown in FIG. 4A, the track assembly 411 and the rack gear 412 extend between the first floor level 40 and the second floor level 41. The robotic drive unit 401 can use the vertical reciprocating lift 410 to lift and lower itself between the first floor level 40 and the second floor level 41.

The lift arm 413 supports the robotic drive unit on the rack gear 412 and includes an arm drive coupling 414 at one distal end, a lift arm guide assembly 415 for supporting the lift arm 413 on and traversing vertically along the rack gear 412, a pinion gear 416 within the lift arm guide assembly 415, and a motion translation mechanism 417 within the lift arm 413. The translation mechanism 417 is mechanically coupled between the arm drive coupling 414 and the pinion gear 416.

Figure 5:
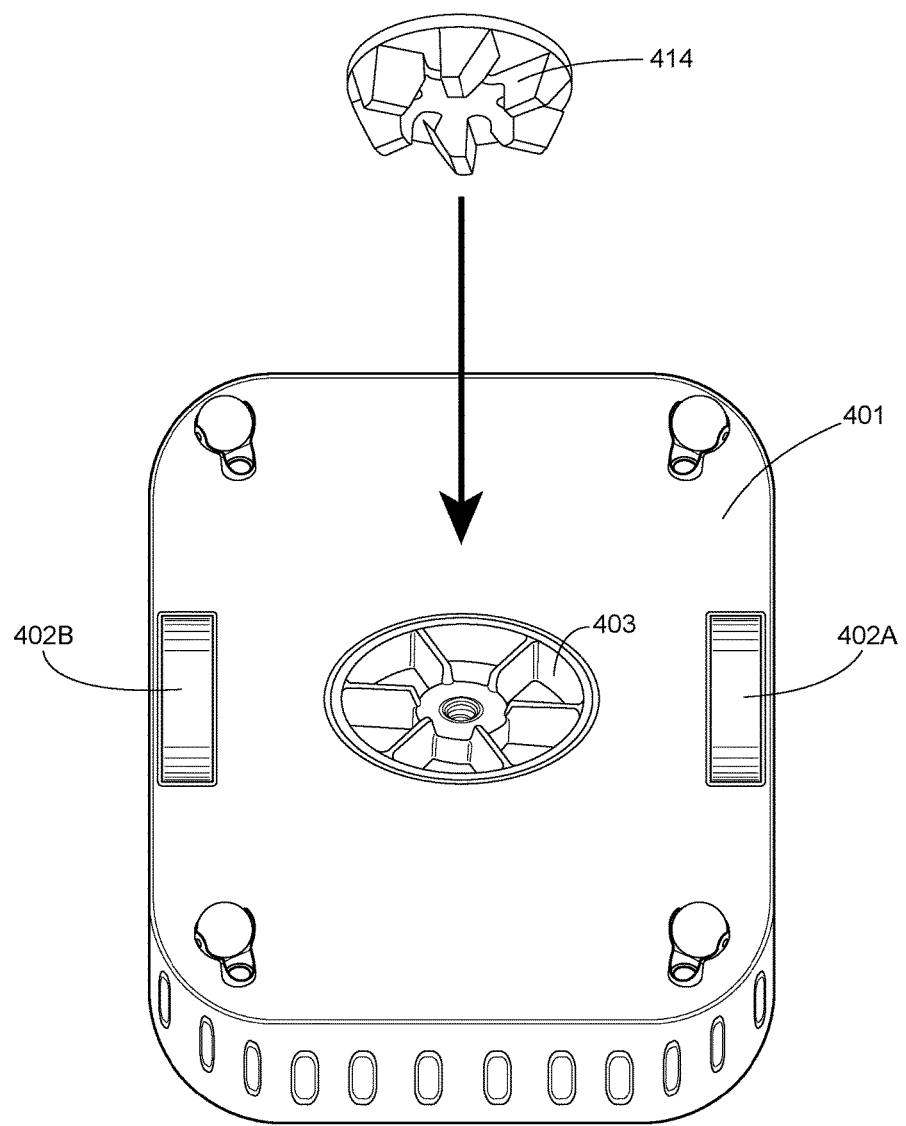
FIG. 5 illustrates the underside of an example robotic drive unit for use with the system shown in FIGS. 4A and 4B according to various embodiments.

The robotic drive unit 401 can drive over or upon the lift arm 413. In that docked position, the robotic drive unit 401 can retract its drive wheels 402 to lower itself upon the lift arm 413. When the drive wheels 402 are retracted, a robotic drive coupling on the underside of the robotic drive unit 401 can be lowered into engagement upon the arm drive coupling 414. The robotic drive coupling on the underside of the robotic drive unit 401 is illustrated in FIG. 5 and described in further detail below. Once engaged with the arm drive coupling 414, the robotic drive unit 401 can raise or lower itself between the first floor level 40 and the second floor level 41 by rotating the robotic drive coupling on its underside. Particularly, based on the translation of the motive forces from the robotic drive unit 401, to the arm drive coupling 414, through the translation mechanism 417, and to the pinion gear 416, the robotic drive unit 401 can raise or lower itself between the first floor level 40 and the second floor level 41 while resting upon the lift arm 413.

Similar to the embodiment shown in FIGS. 1A-1D, the rack gear 412 and the pinion gear 416, which form a linear actuator in the vertical reciprocating lift 410, are embodied as a type of rack and pinion gear arrangement. In other cases, the linear actuator can be embodied as a worm and worm gear arrangement. The linear actuator is not limited to rack and pinion or worm gear structures, however, as any suitable mechanical linear actuator can be relied upon, such as ball screws, belt drives, and other assemblies that convert rotary to linear motion.

The translation mechanism 417 can be embodied as an arrangement of gears, shafts, couplings, etc. to mechanically couple the rotary forces applied to the arm drive coupling 414 to rotary forces that drive the pinion gear 416. In that context, the translation mechanism 417 can include one or more ring and pinion gear arrangements, for example, among other arrangements of gears, shafts, belts, couplings, or other suitable components configured to couple mechanical forces between components.

The vertical reciprocating lift 410 can include one or more arresting mechanisms to arrest the translation mechanism 417, the pinion gear 416, and/or the arm drive coupling 414 when the robotic drive unit 401 is not engaged with or positioned on the vertical reciprocating lift 410. For example, the vertical reciprocating lift 410 can include an arresting mechanism 419 similar to the arresting mechanism 119 shown in FIGS. 1A-1D and described above. The arresting mechanism 419 can be embodied as any suitable mechanical interference or other mechanism, such as an interfering hook, tooth, pin, or other locking feature that inhibits movement when the robotic drive unit 401 is not engaged with or positioned on the vertical reciprocating lift 410. Additionally, the vertical reciprocating lift 410 can include a counterweight similar in form and function to the counterweight 102.

Figure 4B:
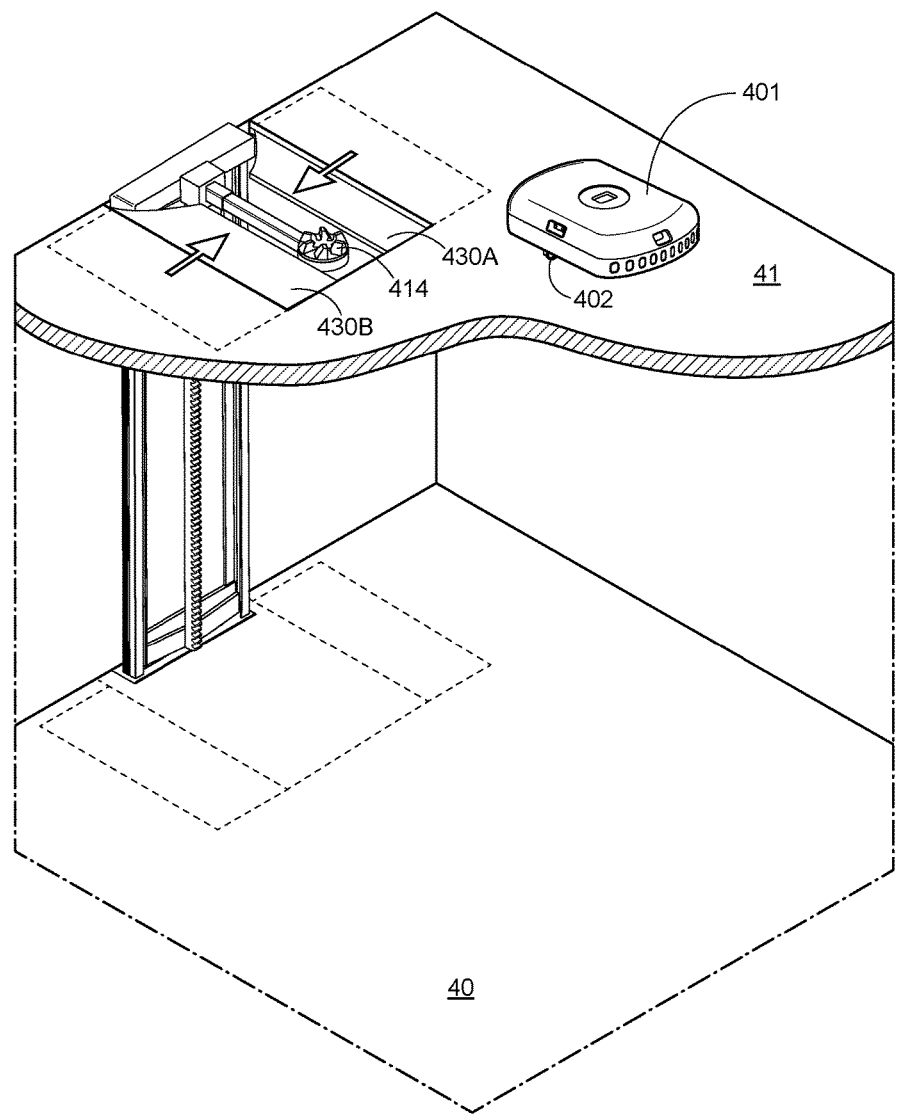
FIG. 4B illustrates the system shown in FIG. 4A with the lift arm raised to a second floor level according to various embodiments.

FIG. 4B illustrates the system 400 shown in FIG. 4A with the lift arm 413 raised to the second floor level 41. A retractable floor panel assembly including floor panels 430A and 430B is also shown in FIG. 4B. The retractable floor panel assembly is configured to advance or retract the floor panels 430A and 430B based on a vertical position of the lift arm 413 between the first floor level 40 and the second floor level 41. More particularly, when the lift arm 413 (and possibly the robotic drive unit 401) is below the second floor level 41, the retractable floor panel assembly can retract the floor panels 430A and 430B to a position hidden within the second floor level 41. In this state, the lift arm 413 and the robotic drive unit 401 can rise up to a position at or near the second floor level 41 without interference with the floor panels 430A and 430B. Once the lift arm 413 and the robotic drive unit 401 are at or relatively above the second floor level 41, the retractable floor panel assembly is configured to advance the floor panels 430A and 430B out from the second floor level 41 and under the drive wheels 402 of the robotic drive unit 401.

With the floor panels 430A and 430B under the drive wheels 402 of the robotic drive unit 401, the robotic drive unit 401 can advance (e.g., un-retract) its drive wheels 402 to contact the floor panels 430A and 430B, raise itself, and disengage the robotic drive coupling on its underside from the arm drive coupling 414. The robotic drive unit 401 can also use the drive wheels 402 to drive upon the floor panels 430A and 430B and onto the second floor level 41.

FIG. 5 illustrates the underside of the robotic drive unit 401 for use with the system 400 shown in FIGS. 4A and 4B. As shown, the robotic drive unit 401 includes the robotic drive coupling 403 with complementary surfaces for engagement with the arm drive coupling 414. As described above with reference to FIGS. 4A and 4B, when the drive wheels 402A and 402B of the robotic drive unit 401 are retracted (e.g., drawn, recessed, or pulled within the robotic drive unit 401), the robotic drive coupling 403 can be lowered upon and engaged with the arm drive coupling 414 to actuate the lifting and lowering functions of the vertical reciprocating lift 410.

Figure 6A:
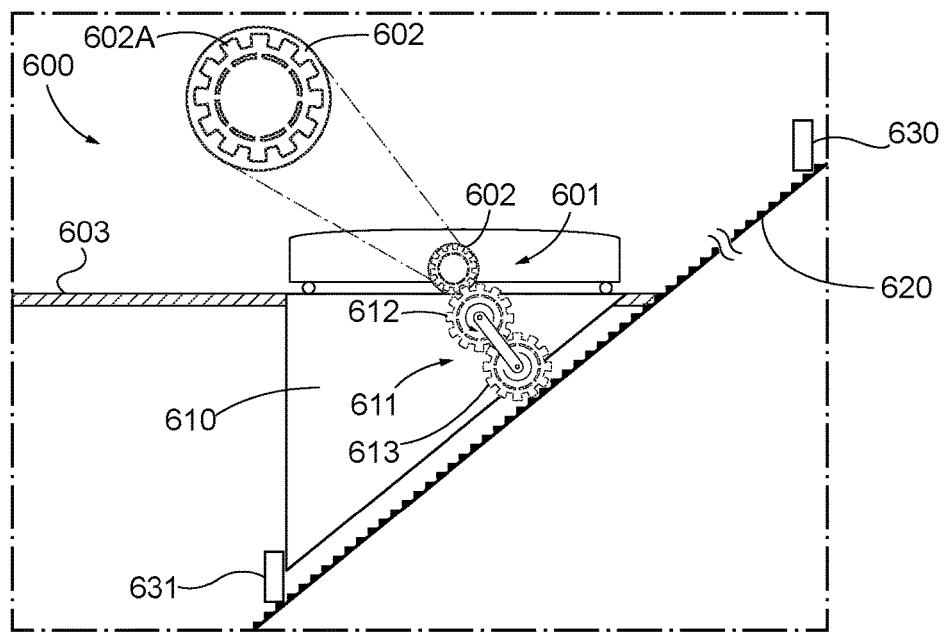
FIG. 6A illustrates a side view of another example robotic enabled vertical lift system including a lift carriage according to various embodiments.
Figure 6B:
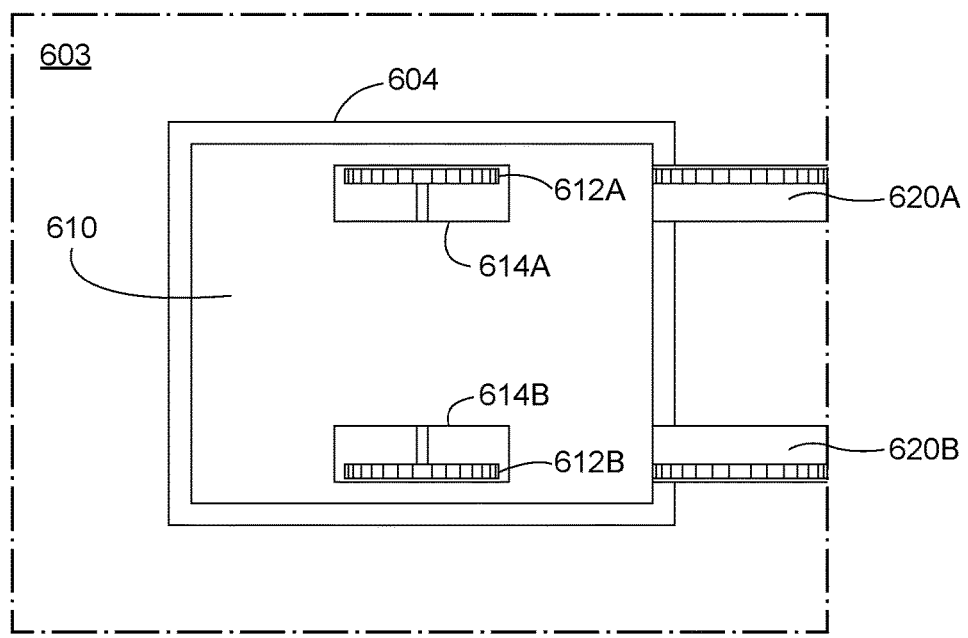
FIG. 6B illustrates a top-down plan view of the lift carriage used in the system shown in FIG. 6A according to various embodiments.

FIG. 6A illustrates a side view of another example robotic enabled vertical lift system 600, and FIG. 6B illustrates a top-down plan view of the vertical lift system 600. Referring between FIGS. 6A and 6B, the vertical lift system 600 includes a robotic drive unit 601, a ramp including rails 620A and 620B (collectively "rails 620") that extend at an incline between a first floor level 603 and other floors or levels, and a lift carriage 610 that rests upon and rides along the rails 620A and 620B.

In a lowered position, the lift carriage 610 can reside below the first floor level 603 (e.g., within the opening 604 in the first floor level 603) such that the top surface of the lift carriage 610 is relatively flush with the surface of the first floor level 603. Thus, the robotic drive unit 601 can drive from the first floor level 603 to a position upon the top surface of the lift carriage 610. In other embodiments where the lift carriage 610 does not fall below the first floor level 603, the robotic drive unit 601 can use a ramp to drive up to and upon the lift carriage 610.

The robotic drive unit 601 includes drive wheels 602 having extended central geared hubs 602A. Additionally, the lift carriage 610 includes an internal gear mechanism 611, and the rails 620A and 620B include teeth. As shown in FIG. 6A, the gear mechanism 611 includes gears 612 and 613, although other numbers, combinations, and arrangements of gears can be used. According to the arrangement of the gear mechanism 611 in the lift carriage 610, teeth of the gear 612 engage with teeth on the gear 613, and teeth of the gear 613 engage with teeth on the rails 620A and 620B.

More particularly, as shown in FIG. 6B, the gear 612 can include a pair of gear ends 612A and 612B secured at two ends of a shaft 612C. The gear ends 612A and 612B are exposed through the apertures 614A and 614B on the top of the lift carriage 610. The gear 613 can also include another pair of gear ends secured at two ends of another shaft (similar to the shaft 612C), the teeth of the gear ends 612A and 612B of the gear 612 can engage with teeth on the gear ends of the gear 613, and teeth of the gear ends of the gear 613 can engage with teeth on the rails 620A and 620B.

In operation, when the robotic drive unit 601 drives upon the lift carriage 610, the drive wheels 602 of the robotic drive unit 601 partially fall into the apertures 614A and 614B. At that time, the teeth of the geared hubs 602A mate with and engage the gear ends 612A and 612B of the gear 612. Once the teeth of the geared hubs 602A and the gear ends 612A and 612B of the gear 612 are engaged, the robotic drive unit 601 can drive the drive wheels 602 clockwise or counter-clockwise. In turn, the internal gear mechanism 611 of the lift carriage 610 translates those motive forces to the teeth of the rails 620 to raise or lower the lift carriage 610 along the rails 620.

Stops 630 and 631, for example, can be mounted along the rails 620 to restrict the movement of the lift carriage 610 to a certain length of the rails 620 (e.g., typically between levels or floors). When the lift carriage 610 is driven by the robotic drive unit 601 until it contacts one of the stops 630 or 631, the stops 630 or 631 will restrict further movement of the gear mechanism 611. In that case, if the drive wheels 602 of the robotic drive unit 601 continue to rotate, the robotic drive unit 601 will drive itself out from the apertures 614A and 614B and upon the first floor level 603, for example, or another floor or level.

Figure 7:
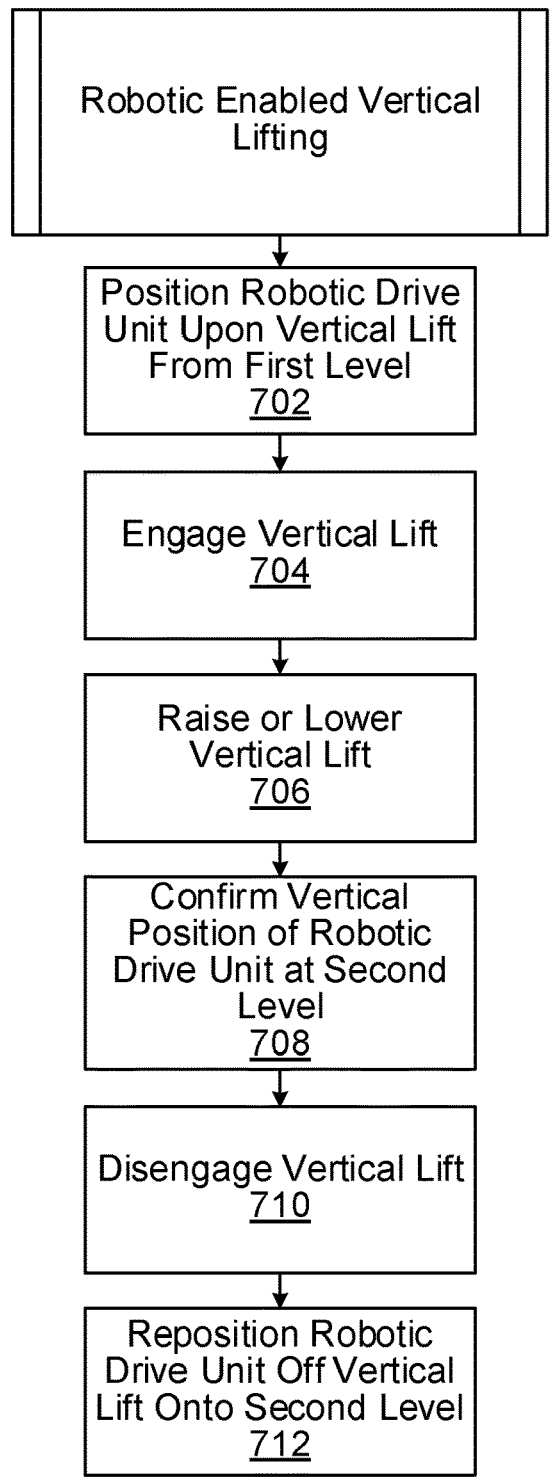
FIG. 7 illustrates an example process of robotic enabled vertical lifting according to various embodiments.

FIG. 7 illustrates an example process of robotic enabled vertical lifting according to various embodiments. In certain aspects, the process flowchart in FIG. 7 can be viewed as depicting an example set of steps performed by one or more of the robotic drive units described herein. The flowchart in FIG. 7 provides merely one example of a sequence or arrangement of steps that can be employed for robotic enabled vertical lift consistent with the concepts described herein. Although the process is described in connection with the robotic enabled vertical lift systems described herein, other vertical lift systems consistent with those described herein can be used perform the process.

At reference numeral 702, the process includes a robotic drive unit positioning itself upon a vertical lift. For example, the robotic drive unit 30 can position itself upon the lift platform 110 of the vertical reciprocating lift 20 shown in FIGS. 1A-1D, the robotic drive unit 401 can position itself upon the lift arm 413 of the vertical reciprocating lift 410 shown in FIGS. 4A and 4B, or the robotic drive unit 601 can position itself upon the lift carriage 610 shown in FIGS. 6A and 6B. As noted above, however, other vertical lift systems (and robotic drive units) consistent with those described herein can be used perform the process at reference numeral 702.

At reference numeral 704, the process includes the robotic drive unit engaging with the vertical lift. For example, the robotic drive unit 30 can further position itself to engage the mating dock connector 32 with the engagement dock 116 as described above with reference to FIGS. 1A-1D. Alternatively, the robotic drive unit 30A can rotate itself for the engagement of its mating dock connector 32A with the engagement dock 116A as described above with reference to FIGS. 2A and 2B. In other cases, the robotic drive unit 401 can retract its drive wheels 402 to lower the robotic drive coupling 403 shown in FIG. 5 upon arm drive coupling 414 shown in FIGS. 4A and 4B. In still other cases, the robotic drive unit 601 can drive upon the lift carriage 610 so that the drive wheels 602 of the robotic drive unit 601 drop and seat into the apertures 614A and 614B as described above with reference to FIGS. 6A and 6B. In that case, the teeth of the geared hubs 602A mate with and engage the gear ends 612A and 612B of the gear 612.

At reference numeral 706, the process includes the robotic drive unit driving or rotating its drive wheels to raise or lower itself. For example, the robotic drive unit 30 can raise or lower the lift platform 110 of the vertical reciprocating lift 20 shown in FIGS. 1A-1D by rotating its drive wheels 31 in clockwise or counter-clockwise directions to apply forces to the treads 111. Similarly, the robotic drive unit 30A can raise or lower the lift platform 110A shown in FIGS. 2A-2B by rotating its drive wheels 31A and 31B in clockwise or counter-clockwise directions to apply forces to the rollers 120A or 120B. In still other cases, the robotic drive unit 401 can drive the robotic drive coupling 403 to raise or lower the lift arm 413 as described above with reference to FIGS. 4A, 4B, and 5, or rotate the drive wheels 602 to raise or lower the lift carriage 610.

At reference numeral 708, the process includes confirming the vertical position of the robotic drive unit. Here, the robotic drive unit can determine and/or confirm whether it has reached a second level, which may be a higher or lower level than the first level at reference numeral 702, based on the amount of rotation of one or more drive wheels, for example, or by reading indicators similar to the indicators 341-343 shown in FIG. 3 at a certain level or floor. In other cases, the vertical lift can incorporate a mechanical interference that stops or arrests a lift platform, arm, or carriage at a certain position. For example, the stops 630 and 631 shown in FIG. 6A can restrict the movement of the lift carriage 610 to a certain length of the rails 620 (e.g., typically between levels or floors). In other cases, a rack gear might stop or prevent movement beyond a certain range.

At reference 710, the process includes the robotic drive unit disengaging from the vertical lift at the second level. For example, the robotic drive unit 30 can disengage itself from the engagement dock 116 upon reaching a desired floor as described above with reference to FIGS. 1A-1D. Alternatively, the robotic drive unit 30A can rotate itself for disengagement from the engagement dock 116A as described above with reference to FIGS. 2A and 2B. In other cases, the robotic drive unit 401 can advance (e.g., unretract) its drive wheels 402 to contact the floor panels 430A and 430B, raise itself, and disengage the robotic drive coupling 403 from the arm drive coupling 414 as described above with reference to FIGS. 4A, 4B, and 5. In still other cases, the robotic drive unit 601 can drive off the lift carriage 610 when it encounters one of the stops 630 and 631 shown in FIG. 6A.

At reference numeral 712, the process includes the robotic drive unit repositioning itself (e.g., driving upon) to any desired position on the second level. At the second level the robotic drive unit can assist with picking and placing items, for example, or any other task.

Although embodiments have been described herein in detail, the descriptions are by way of example. The features of the embodiments described herein are representative and, in alternative embodiments, certain features and elements can be added or omitted. Additionally, modifications to aspects of the embodiments described herein can be made by those skilled in the art without departing from the spirit and scope of the present invention defined in the following claims, the scope of which are to be accorded the broadest interpretation so as to encompass modifications and equivalent structures.

Therefore, at least the following is claimed:

1. A vertical reciprocating lift, comprising:
a vertically directed track assembly that extends between a first floor level and a second floor level;
a first gear of a vertically directed linear actuator that extends between the first floor level and the second floor level; and
a lift platform comprising an engagement dock, a continuous contact roller exposed through an opening in a top surface of the lift platform, a platform guide assembly for engagement with the vertically directed track assembly, a second gear of the linear actuator, and a motion translation mechanism mechanically coupled between the continuous contact roller and the second gear of the linear actuator, wherein:
the engagement dock comprises an arresting mechanism configured to mechanically interfere with and arrest at least one of the motion translation mechanism or the second gear of the linear actuator when a mating connector of a robotic drive unit is disengaged from the engagement dock.

2. The vertical reciprocating lift according to claim 1, wherein the motion translation mechanism mechanically translates motive forces from the continuous contact roller to the second gear of the linear actuator to either raise or lower the lift platform between the first floor level and the second floor level using the linear actuator.

3. The vertical reciprocating lift according to claim 1, wherein:
when the mating connector of the robotic drive unit is engaged with the engagement dock of the lift platform, at least one drive wheel of the robotic drive unit is positioned over the continuous contact roller to apply motive forces to the continuous contact roller and either raise or lower the lift platform between the first floor level and the second floor level.

4. The vertical reciprocating lift according to claim 1, wherein the arresting mechanism comprises at least one of an interfering hook, tooth, or pin to mechanically interfere with and arrest at least one of the motion translation mechanism or the second gear of the linear actuator when the mating connector of the robotic drive unit is disengaged from the engagement dock of the lift platform.

5. The vertical reciprocating lift according to claim 1, wherein the arresting mechanism of the engagement dock releases at least one of the motion translation mechanism or the second gear of the linear actuator when the mating connector of the robotic drive unit is engaged with the engagement dock of the lift platform.

6. The vertical reciprocating lift according to claim 1, further comprising a counterweight assembly comprising a weight counterbalanced against the lift platform.

7. The vertical reciprocating lift according to claim 1, wherein the continuous contact roller comprises a pair of continuous tread belts exposed through the opening in the top surface of the lift platform.

8. The vertical reciprocating lift according to claim 1, wherein:
the continuous contact roller comprises at least two pairs of rollers exposed through the opening in the top surface of the lift platform; and
the at least two pairs of rollers are mechanically joined through the motion translation mechanism and substantially seize in response to an application of substantially opposing motive forces.

9. A vertical reciprocating lift, comprising:
a first gear of a vertically directed linear actuator that extends between a first floor level and a second floor level; and
a means for supporting a robotic drive unit between the first floor level and the second floor level along the first gear of the vertically directed linear actuator, the means for supporting the robotic drive unit comprising an engagement dock and a means for mechanically translating motive forces from a drive wheel of the robotic drive unit to a second gear of the linear actuator to raise or lower the means for supporting the robotic drive unit between the first floor level and the second floor level, wherein:
the engagement dock comprises a means for mechanically interfering with the means for mechanically translating motive forces when a mating connector of a robotic drive unit is disengaged from the engagement dock.

10. The vertical reciprocating lift according to claim 9, further comprising a retractable floor panel assembly configured to advance or retract at least one floor panel based on a vertical position of the means for supporting the robotic drive unit between the first floor level and the second floor level.

11. The vertical reciprocating lift according to claim 9, wherein:
the means for supporting a robotic drive unit comprises a lift platform, a continuous contact roller exposed through an opening in a top surface of the lift platform, and a second gear of the linear actuator; and
the means for mechanically translating the motive forces comprises a motion translation mechanism mechanically coupled between the continuous contact roller and the second gear of the linear actuator.

12. The vertical reciprocating lift according to claim 11, wherein the continuous contact roller comprises a pair of continuous tread belts exposed through the opening in the top surface of the lift platform.

13. The vertical reciprocating lift according to claim 11, further comprising a counterweight assembly comprising a weight counterbalanced against the lift platform.

14. The vertical reciprocating lift according to claim 11, wherein the motion translation mechanism mechanically translates motive forces from the continuous contact roller to the second gear of the linear actuator to either raise or lower the lift platform between the first floor level and the second floor level using the linear actuator.

15. The vertical reciprocating lift according to claim 11, wherein:
when the mating connector of the robotic drive unit is engaged with the engagement dock of the lift platform, at least one drive wheel of the robotic drive unit is positioned over the continuous contact roller to apply motive forces to the continuous contact roller and either raise or lower the lift platform between the first floor level and the second floor level.

16. The vertical reciprocating lift according to claim 9, wherein the means for mechanically interfering comprises at least one of an interfering hook, tooth, or pin to mechanically interfere with and arrest at least one of the means for mechanically translating motive forces or the second gear of the linear actuator when the mating connector of the robotic drive unit is disengaged from the engagement dock.

17. A vertical reciprocating lift, comprising:
a first gear of a vertically directed linear actuator that extends between floor levels; and
a lift platform comprising an engagement dock, a roller exposed through an opening in a top surface of the lift platform, a second gear of the linear actuator, and a motion translation mechanism mechanically coupled between the roller and the second gear of the linear actuator, wherein:
the engagement dock comprises an arresting mechanism configured to mechanically interfere with and arrest at least one of the motion translation mechanism or the second gear of the linear actuator when a mating connector of a robotic drive unit is disengaged from the engagement dock.

18. The vertical reciprocating lift according to claim 17, wherein the motion translation mechanism mechanically translates motive forces from the roller to the second gear of the linear actuator to either raise or lower the lift platform.

19. The vertical reciprocating lift according to claim 17, wherein:
when the mating connector of the robotic drive unit is engaged with the engagement dock of the lift platform, at least one drive wheel of the robotic drive unit is positioned over the roller to apply motive forces to the roller and either raise or lower the lift platform.

20. The vertical reciprocating lift according to claim 17, wherein the arresting mechanism comprises at least one of an interfering hook, tooth, or pin to mechanically interfere with and arrest at least one of the motion translation mechanism or the second gear of the linear actuator when the mating connector of the robotic drive unit is disengaged from the engagement dock of the lift platform.

* * * * *